June 28, 1955  H. L. G. SUNLEY  2,711,751
CONTROL SYSTEM FOR A ROCKET MOTOR
Filed March 8, 1952  2 Sheets-Sheet 1
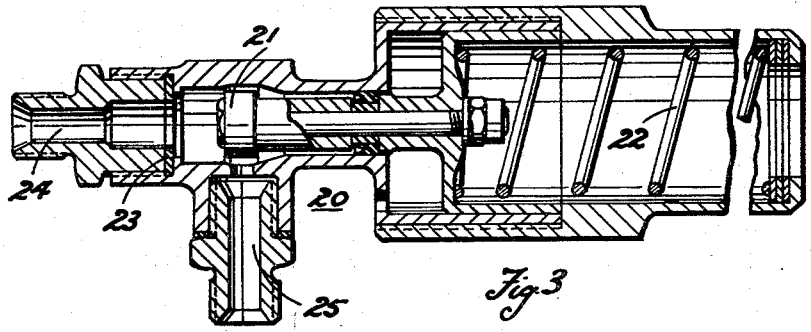
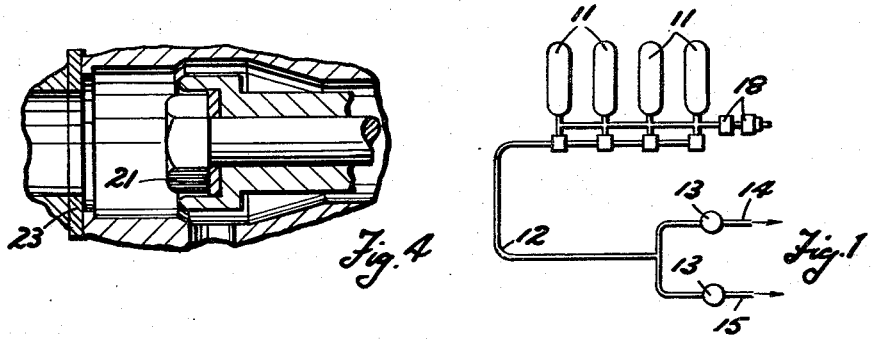
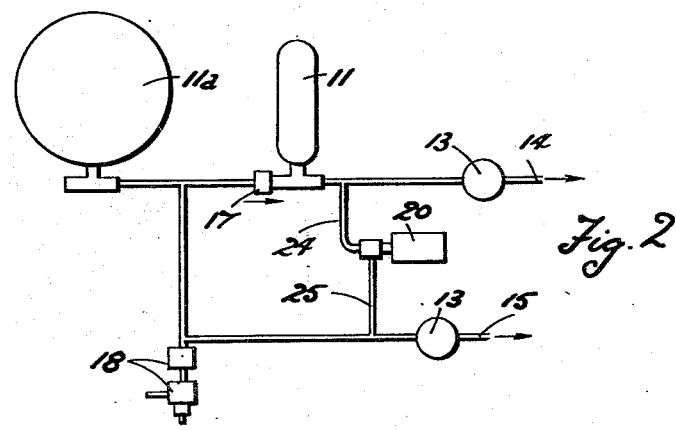
INVENTOR
H. L. G. SUNLEY
By Mawkinney & Mawkinney
ATTYS.

United States Patent Office 2,711,751
Patented June 28, 1955

2,711,751

CONTROL SYSTEM FOR A ROCKET MOTOR

Henry L. G. Sunley, Coventry, England, assignor to Armstrong Siddeley Motors Limited, Coventry, England Application March 8, 1952, Serial No. 275,501

Claims priority, application Great Britain March 30, 1951

3 Claims. (Cl. 137—208)

This invention relates to a control system, particularly for a rocket motor, of the kind having at least one valve or other control part which is operable by a relatively-high fluid pressure (e. g., about 450 pounds per square inch, or 30 kg. per square cm.) but which does not require a continuous fluid flow (except for unwanted leakage), and at least one other part, such as a fuel tank or an oxygen tank which is to be "pressurized," which is to be supplied at a relatively-low fluid pressure (e. g., about 10 pounds per square inch, or 0.7 kg. per square cm.) and which requires a continuous fluid flow.

In the case of a rocket motor mounted on an aircraft having also some other prime-mover, it is known to use a number of receptacles containing nitrogen at a relatively-high pressure for "pressurising" both the fuel tank and the oxygen tank, delivering thereto through appropriate pressure-reducing valves; and to supply high pressure valves and other control parts from a compressor driven by the said prime-mover. The disadvantage of that is that oil or other impurities may enter the control system of the rocket motor; and for that and other reasons it is preferable to segregate the control system for the rocket motor from the said prime-mover.

According to the invention, the source of pressure, for both the relatively-high and relatively-low pressure-receiving parts, is provided by at least two receptacles containing a relatively-very-high pressure (e. g., initially about 1800 pounds per square inch, or 120 kg. per square cm.), and one of these receptacles is connected to supply the said control part (or parts) through an appropriate pressure-reducing valve means, and the other to supply the relatively-low pressure-receiving part (or parts) through an appropriate pressure-reducing valve means; whilst between the outlets of the receptacles and the pressure-reducing valve means the two receptacles are interconnected through a pressure-responsive reserve valve which only closes when the pressure in the receptacles falls to a predetermined value (e. g., about 500 pounds per square inch, or 33 kg. per square cm.) which is greater than that required for operating the said control part or parts. Thus, normally the supplies to the different pressure-receiving parts are from the receptacles acting in parallel, but when this predetermined pressure is reached the supplies to the said parts are respectively segregated, so that the rocket motor can continue to operate until the pressure in the one receptacle falls to the said relatively-high pressure (e. g., 450 pounds per square inch) at which the said control part (or parts) is supplied, and the pressure in the other receptacle can continue to be used down to the said relatively-low pressure.

In practice, it is preferable to use, say, four such receptacles, e. g., "nitrogen bottles," three of them always being connected in parallel with one another to supply "pressurising" fluid to both the fuel tank and the oxygen tank, through the associated pressure-reducing valves, when the pressure-responsive reserve valve closes, the fourth bottle alone supplying, through the necessary reducing valves, the relatively-high pressures required by the various fluid-pressure valves and other controls when segregated by the reserve valve from the other three bottles. Obviously the said three bottles may be replaced by a single bottle of three times the capacity.

In the accompanying drawings:

Figure 1 is a diagram of the known arrangement in which a number of receptacles (four being shown) are arranged in parallel to supply, in parallel, both the relatively-high fluid pressure and the relatively-low fluid pressure required by a rocket motor system;

Figure 2 is a diagram of the same apparatus arranged according to the invention, i. e., provided with a pressure-responsive reserve valve, though in this figure three of the receptacles are replaced by a single one of three times the capacity;

Figure 3 is a sectional elevation of the reserve valve, Figure 4 being a fragmentary section to a larger scale of the actual valve head.

Figure 5:
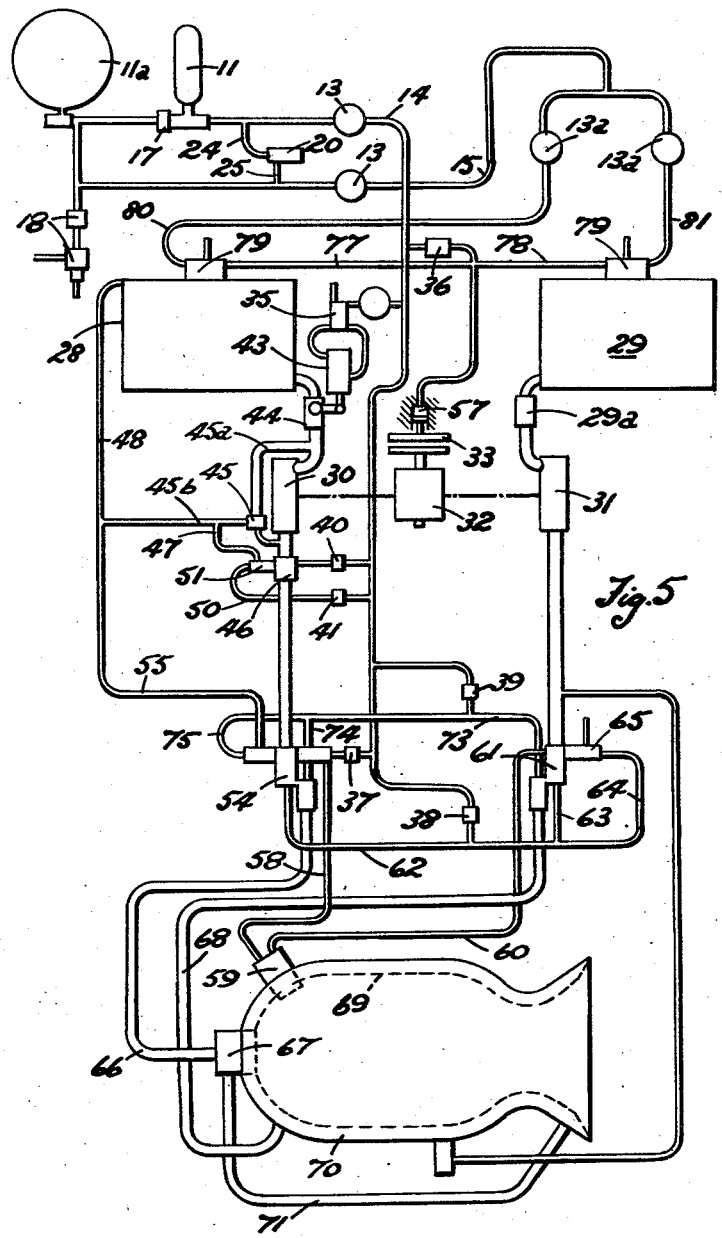
Figure 5 is a diagram of a rocket motor to the control system of which the fluid pressure supply means of the invention is applied.

Figure 1 shows four similar bottles 11, containing fluid at a pressure of, say, 1800 pounds per square inch, connected in parallel to the pipe line 12 which supplies, through reducing valves 13, both the relatively-high pressure pipe line 14 and the relatively-low pressure pipe line 15.

In the system of Figure 2, in which the reference numerals 13, 14 and 15 are also applied to designate those similar parts mentioned in connection with Figure 1, three of the receptacles are combined into one receptacle 11a which is of three times the capacity of the fourth receptacle 11. A one-way valve 17 is interposed in the pipe line between the receptacle 11a and 11, this valve allowing both cylinders 11, 11a to be charged from a common supply point, the flow through the valve being in the direction of the arrow.

In both Figures 1 and 2, 18 represents a charging valve means connected to supply all the receptacles in parallel. The valve 17 opens to allow the charging pressure to reach the receptacle 11. Obviously, however, separate supply points could be provided for the respective cylinders 11, 11a, in which event the valve 17, and the conduit connecting it to the conduit from valve 18 to the cylinder 11a, would not be necessary.

The reserve valve 20 (Figures 2, 3 and 4) has a valve member 21 which is pressed by a spring 22 towards a seating 23, but as long as the pressure in the pipe lines 24, 25, which interconnect the receptacles 11, 11a, exceeds a predetermined value (e. g., exceeds 500 pounds per square inch), the valve 20 remains open, i. e., in the position shown in Figures 3 and 4. When, however, the pressure in the receptacles falls below the said predetermined value the reserve valve 20 closes to segregate the receptacle 11 from the relatively-low pressure line 15. The pressure in the relatively-high pressure line 14 will normally fall quite slowly, but the relatively-low pressure will be continued to be suppied to the ine 15 from the receptacle 11a.

In this connection it will be appreciated that there is only a small loss, due to leakage, past the said control part or parts once the latter have been operated, but with the fuel and oxygen tanks the loss is much greater, and the invention enables an economical compromise to be effected in the use of receptacles. It will also be understood that, without the present arrangement, i. e., with both receptacles always acting in parallel, as in Figure 1, they would only be useful for operating the rocket motor down to the relatively-high pressure required for operating the said control part or parts, which would be uneconomical and would probably not enable a complete operation, let alone successive operations, of the rocket motor to be effected. Similar objections would be present if separate receptacles were initially employed for pressurising the tanks and for operating the said control part or parts.

With reference now to Figure 5, this shows a rocket motor of the kind which is adapted to be controlled substantially as disclosed in the specification of U. S. application Serial No. 240,216, filed 3rd August 1951, in the name of Sidney Allen and Dennis Hurden. A tank for liquid oxygen is shown at 28, and one for fuel at 29. 30, 31 are the respective pumps therefor. 32 represents a gear box by means of which the pumps can be driven when a clutch 33 is engaged.

The electrical connections are omitted in the present instance but there are a number of solenoid-operated valves or other valves, marked 35, 36, 37, 38, 39, 40 and 41, for supplying the relatively-high pressure, delivered along the pipe line 14, to various plungers or the like. There is no flow through these parts (i. e., past these plungers), as long as there is no leakage.

Some of these parts will now be briefly referred to. Thus, in starting up, the valve 35 is opened and the relatively-high pressure fluid is applied to an actuator 43 to open a supply valve 44 from the tank 28 by which part of the oxygen system, including the pump 30, is cooled. 45 represents a priming valve which closes a by-pass line 45a, 45b when (later) the output pressure of the oxygen pump reaches a predetermined value. 46 is a constrictor valve which, in starting conditions, is in its closed restricting position, the liquid oxygen and vapour in the by-pass 45a, and that passing through the pump and along the line 47, being in communication with the oxygen tank by way of the pipe lines 45b, 48.

After the oxygen system has been partly cooled in this way the rocket motor can be started at any time by opening the valve 36. Opening the valve 36 not only effects the pressurising of the two tanks (as hereinafter described), but also supplies the relatively-high pressure to an actuator 57, which engages the clutch 33 and drives the gear box 32 by which the pumps 30, 31 are driven. In due course the oxygen pump primes, pumping liquid back to the tank along the by-pass passage 47, 45b and 48, the priming valve 45 closing. In addition, a small quantity of the liquid passes through the constrictor valve 46 as far as the combined stop and throttle valve 54, whence it returns to the tank along the by-pass passage 55, 48.

About four seconds after the oxygen pump has primed, a fuel shut-off valve 29a is opened, and the fuel pump 31 primes almost immediately. Thereupon a solenoid operated valve 40 is opened, supplying relatively-high pressure to the actuating element of the constrictor valve 46 fully to open this constrictor valve. At the same time the solenoid operated valve 37 is opened to supply the relatively-high pressure to an appropriate plunger of the stop and throttle valve 54, whereby some of the oxygen being pumped is passed along a line 58 to the igniter 59. Meanwhile fuel is being passed to the igniter 59 (as soon as the fuel pump primes) along a pipe line 60 from the fuel stop and throttle valve 61.

When the igniter 59 is operating the solenoid operated valves 38 and 41 are opened. The former admits the relatively-high fluid pressure along the lines 62, 63 to open the stop valves of the combined stop and throttle valves, and also along the line 64 to an actuator by which a fuel spill valve 65 is closed. As the throttle valves, when closed, pass approximately one-third of the liquid which they pass when they are fully opened, oxygen is supplied along the pipe line 66 to the main burner 67 and fuel is supplied along the line 68 to the jacket space 69 of the main combustion chamber 70 for cooling the latter, whence the fuel is returned by the pipe 71 to the main burner 67. Meanwhile, the opening of the solenoid operated valve 41 supplies the relatively-high fluid pressure to an actuator 51 which closes the inlet to the oxygen by-pass 47.

Finally, when full thrust is desired, the valve 39 is opened to supply the relatively-high pressure along the pipe lines 73 and 74 to fully open the throttle valves, by acting on their plungers, and along the pipe line 75 to close a valve for the by-pass circuit 55, 48 for the liquid oxygen.

For pressurising the oxygen and fuel tanks, the opening of the valve 36 also supplies the relatively-high pressure along the lines 77, 78 to actuators 79 which serve for closing the normal vent valves of the tanks and simultaneously for connecting the tanks to the lines 80, 81 which supply the relatively-low fluid pressure (the pressure being further reduced by the reducing valves 13a) for pressurising the tanks.

What I claim as my invention and desire to secure by Letters Patent of the United States is:

1. A control system, particularly for a rocket motor, of the kind having at least one valve or other control part which is operable by a relatively-high fluid pressure but which does not require a continuous fluid flow (except for unwanted leakage), and at least one other part which is to be supplied at a relatively-low fluid pressure and which requires a continuous flow, including at least two receptacles containing a relatively-very-high pressure, pressure-reducing valve means through which the said two pressures are respectively supplied to the said two parts from said receptacles, and, on the inlet sides of the pressure-reducing valve means, a pressure-responsive reserve valve interconnecting the receptacles, said pressure in said receptacles when in excess of a predetermined value maintaining said valve open, said valve, when open, establishing a supply to both said pressure-reducing valve means from both said receptacles in parallel, said reserve valve arranged to close for causing the receptacles only to feed the parts respectively when the pressure in the receptacles falls to said predetermined value, which is, however, higher than said relatively-high pressure.

2. An arrangement, according to claim 1, in which use is made of a relatively large-capacity receptacle for the relatively-low-pressure supply, a relatively small-capacity receptacle supplying the relatively-high pressure, when said reserve valve is closed.

3. A control system, particularly for a rocket motor, of the kind having at least one valve or other control part which is operable by a relatively-high fluid pressure but which does not require a continuous fluid flow (except for unwanted leakage), and at least one other part which is to be supplied at a relatively-low fluid pressure and which requires a continuous flow, including at least two receptacles containing a relatively-very-high pressure, pressure-reducing valve means through which the said two pressures are respectively supplied to the said two parts from said receptacles, and, on the inlet sides of the pressure-reducing valve means, a pressure-responsive reserve valve interconnecting the receptacles, said pressure in said receptacles when in excess of a predetermined value maintaining said valve open, said valve, when open, establishing a supply to both said pressure-reducing valve means from both said receptacles, in parallel, said reserve valve arranged to close for causing the receptacles only to feed the parts respectively when the pressure in the receptacles falls to said predetermined value, which is, however, higher than said relatively-high pressure, and a conduit through which fluid under pressure can be supplied for charging said receptacles, a check valve positioned in said conduit and between said receptacles, said check valve permitting a charge of fluid to flow to said receptacle supplying said one part but preventing any reverse flow from said receptacle through said check valve.

References Cited in the file of this patent

UNITED STATES PATENTS 2,470,564     Lawrence et al. _____ May 17, 1949